April 5, 1960     A. C. DE ANGELIS ET AL     2,931,632
BEATER RELEASE MEANS FOR ELECTRIC MIXERS Original Filed Sept. 15, 1955     2 Sheets-Sheet 1

INVENTORS.
ANGELO C. DE ANGELIS
HARRY E. BUTTERFIELD, JR.

April 5, 1960   A. C. DE ANGELIS ET AL   2,931,632
BEATER RELEASE MEANS FOR ELECTRIC MIXERS
Original Filed Sept. 15, 1955   2 Sheets-Sheet 2
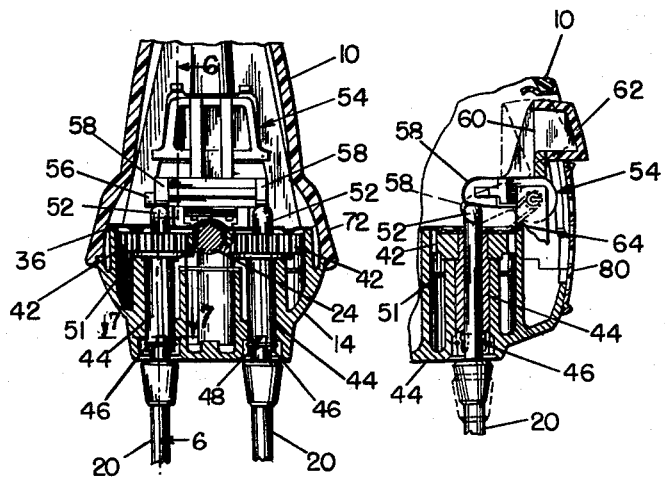
Fig. 3.   Fig. 4.
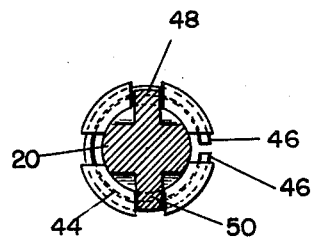   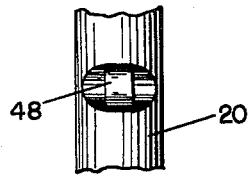
Fig. 5.   Fig. 6.
INVENTORS
ANGELO C. DE ANGELIS
HARRY E. BUTTERFIELD, JR.

United States Patent Office 2,931,632
Patented Apr. 5, 1960

2,931,632
BEATER RELEASE MEANS FOR ELECTRIC MIXERS

Angelo C. De Angelis, New Shrewsbury, and Harry E. Butterfield, Jr., Maplewood, N.J., assignors, by mesne assignments, to Dynamics Corporation of America, New York, N.Y., a corporation of New York Original application September 15, 1955, Serial No. 534,499, now Patent No. 2,812,166, dated November 5, 1957. Divided and this application August 5, 1957, Serial No. 676,339

1 Claim. (Cl. 259—1)

This invention relates to improvements in electric motor driven mixers and is concerned more particularly with portable food and beverage mixers known as hand mixers.

The general object of the invention is to provide an improved device from the standpoints of adaptability for varied uses, convenience of manipulation, economy of manufacture and durability in use.

Another particular object of the invention is to provide improved beater blade ejecting means which is composed of a minimum number of parts and which may be conveniently manipulated for releasing the beater blades from their support in driving connection with the motor for washing or cleaning.

Other objects and advantages of the invention will be apparent from the following detailed explanation taken in conjunction with the accompanying drawings wherein a preferred embodiment of the principles of the invention has been selected for exemplification.

In the drawings:

Fig. 3 is a sectional view taken on the line 5—5 of Fig. 1 looking in the direction of the arrows;

Fig. 4 is a sectional view taken substantially on the line 6—6 of Fig. 3 looking in the direction of the arrows;

Fig. 5 is a sectional view taken on the line 7—7 of Fig. 3 looking in the direction of the arrows;

Fig. 6 is a fragmentary side elevational view of the beater shaft.

Figure 1:
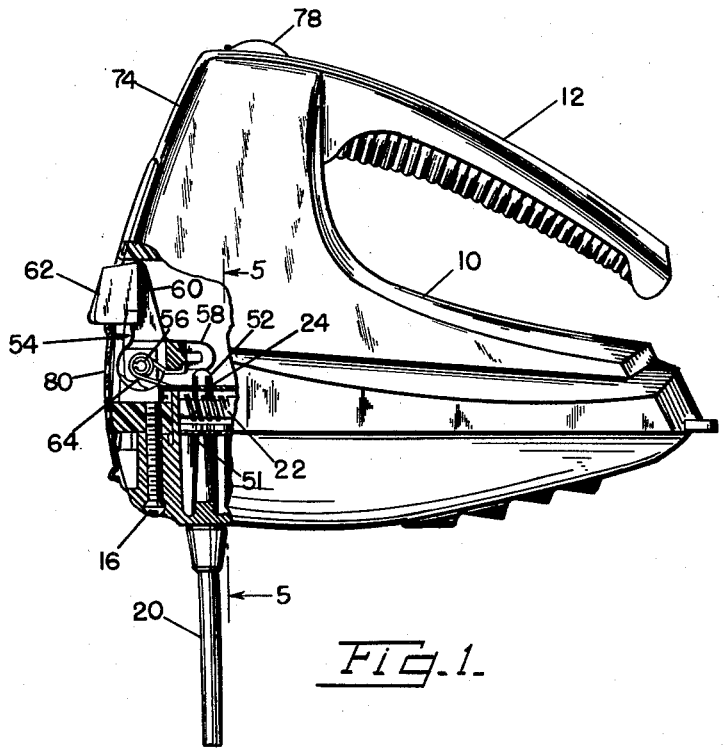
Fig. 1 is an enlarged side elevational view of the device partly in section to show the beater releasing means.
Figure 2:
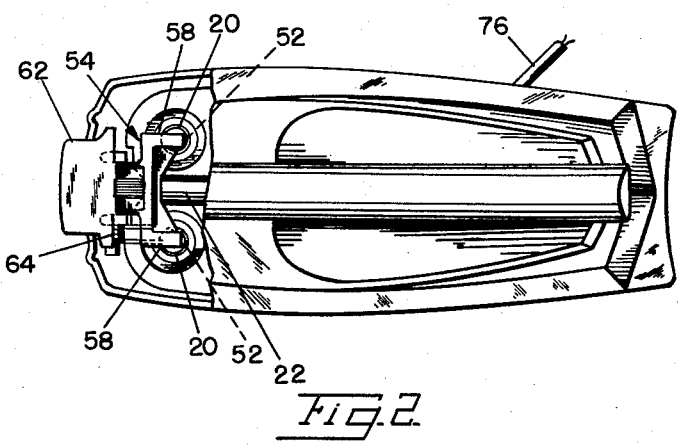
Fig. 2 is a top plan view of the device partly in section.

Referring more particularly to the drawings, wherein like designations refer to like parts, the device in its essentials is composed of a top housing 10 including an integral handle 12 which may, if desired, be molded from any suitable plastic material. As shown in Fig. 1, the handle 12 slopes rearwardly and downwardly at a convenient angle for grasping by the user. The bottom housing 14 is preferably cast of metal and the two housings are detachably secured together by screws or the like 16. The beater means may be of conventional construction and includes a shaft 20 rotatably supported in the bottom housing as will hereinafter be described.

The electric motor (not shown) may also be of conventional construction and includes a shaft 22 having a driving worm 24 at its forward end.

The worm 24 of the motor drive shaft 22, as best shown in Fig. 3, is in driving engagement with opposed gears 42 which may be pressed on vertical hollow gear shafts 44 having split bottom extremities for reception of the upper ends of the beater shafts 20. The split ends of the shafts 44 carry annular snap rings 46 beyond which projecting lugs 48 on the upper end of the beater shafts 20 may be thrust so that the keyed portions 50 of the beater shafts are in driven engagement with the gear shafts or driving barrels 44. Plate 51 retains packing grease around the worm and gear assembly. The upper extremities 52 of the shaft 20 project upwardly through and above the hollow shafts 44, as shown.

For ejecting the beater shafts 20 from their support within the bottom housing 14 as above described, a beater release lever 54 is provided which is pivotally supported on a roll pin 56 which in turn is supported by upright posts extending upwardly of the bottom housing 14. As shown, the beater release lever 54 includes an integral yoke arm 58 which bears against the upper projecting ends 52 of the beater shafts 20 and an integral upright arm 60 provided with a thrust button 62 which, as shown, is accessible from the front exterior of the top housing. The release lever 54 is normally held in the position shown in Fig. 5 and in solid lines in Fig. 4 by the spring 64 and, as will be apparent from the broken line positions shown in Fig. 4, when the button 62 is pressed inwardly the arm 58 will thrust the lugs 48 of the shafts 20 downwardly of the locking rings 46 whereby to eject the beater assemblies from the housing. It will also be apparent, particularly from Figs. 5 and 6, that the lugs 48 are of arcuate configuration such as to exert a cam action against the surrounding rings 46 as the lugs are pushed past the rings. Thus, the rings 46 act as injector and ejector springs abruptly to snap the shafts 20 in locking driven engagement with the driving barrels 44 as the lugs are pushed upwardly past the rings and abruptly to release the shafts as the lugs are urged downwardly past the rings. The latter function is particularly important since it enables the shafts to be spring ejected from the housing 14 in contrast with mere gravity fall.

For the operation of the device, a cord or conduit 76 is provided for connection with an outlet for a source of electric current and multi-speed switch means indicated in its entirety at 78 is preferably provided such as shown, for example, in Patent Nos. 2,707,741 or 2,708,227. Such a switch is preferably mounted in the forward portion of the handle 12 in the manner claimed in Patent No. 2,719,238, dated September 27, 1955.

It is to be understood that the specific construction and arrangements of parts herein illustrated and described are for exemplary purposes only and that the principles of the invention embrace all such variations and modifications thereof as come within the scope of the following claim.

This application is a division of our application Serial No. 534,499, filed September 15, 1955, for "Electric Mixer," now U.S. Patent No. 2,812,166, issued November 5, 1957.

We claim:

In an electric motor driven portable mixer including a motor, a housing therefor, a handle above said housing, two motor driven beater means depending from the bottom of said housing, each of said beater means including a shaft having a free end extending upwardly within said housing and held within said housing by a spring retaining means, the improvement which comprises, a rod secured horizontally within the upper forward section of said housing and below said handle, a beater release lever pivotally supported by said rod, said release lever having two integral fingers extending within said housing and bearing against the free ends of said shafts, a button attached to said release lever, said button extending above said rod and through an opening in the forward portion of the housing and below said handle, spring means within said housing for biasing said relase lever in a direction about said bar to force said button outwardly, whereby pressure on the outer portion of said button rotates said release lever about said rod and causes said fingers to overcome the bias of said spring retaining means and eject said beaters from said housing.

References Cited in the file of this patent

UNITED STATES PATENTS

| | | |
|---|---|---|
| 2,325,434 | Stiles | July 27, 1943 |
| 2,515,755 | Krause | July 18, 1950 |
| 2,566,907 | Robertson | Sept. 4, 1951 |
| 2,738,959 | Schott | Mar. 20, 1956 |
| 2,744,734 | Schoen | May 8, 1956 |
| 2,798,696 | Kuhagen et al. | July 9, 1957 |
| 2,812,166 | De Angelis et al. | Nov. 5, 1957 |